US 012074769B2

(12) United States Patent
Arutiunian et al.

(10) Patent No.: US 12,074,769 B2
(45) Date of Patent: Aug. 27, 2024

(54) TRANSMISSION OF TELEGRAMS BY A NETWORK DISTRIBUTOR IN AN AUTOMATION NETWORK

(71) Applicant: Grow Director LTD, Rishon LeZion (IL)

(72) Inventors: Arsen Arutiunian, Odessa (UA); Dmitry Chernobilsky, Ashqelon (IL)

(73) Assignee: Grow Director Ltd, Rishon Lezion (IL)

( * ) Notice: Subject to any disclaimer, the term of this patent is extended or adjusted under 35 U.S.C. 154(b) by 87 days.

(21) Appl. No.: 17/817,286

(22) Filed: Aug. 3, 2022

(65) Prior Publication Data

US 2024/0048452 A1   Feb. 8, 2024

(51) Int. Cl.
H04L 41/12        (2022.01)
H04L 41/082       (2022.01)
H04L 41/0823      (2022.01)

(52) U.S. Cl.
CPC ............ H04L 41/12 (2013.01); H04L 41/082 (2013.01); H04L 41/0823 (2013.01)

(58) Field of Classification Search
CPC .... H04L 41/12; H04L 41/082; H04L 41/0823
See application file for complete search history.

(56) References Cited

U.S. PATENT DOCUMENTS

| | | |
|---|---|---|
| 9,287,713 B2 | 3/2016 | Sharon et al. |
| 11,088,934 B2 | 8/2021 | Patwardhan et al. |
| 11,184,244 B2 | 11/2021 | Panigrahi et al. |
| 11,706,146 B1 * | 7/2023 | Joliveau ................. H04L 45/02 370/230 |
| 2011/0051624 A1 * | 3/2011 | Gnanasekaran ...... H04L 45/583 370/254 |
| 2014/0037227 A1 * | 2/2014 | Zhang ................... G06F 18/231 382/286 |
| 2020/0044940 A1 | 2/2020 | Thomasson et al. |
| 2020/0186431 A1 * | 6/2020 | Chamarajnager ..... H04L 43/028 |

(Continued)

FOREIGN PATENT DOCUMENTS

WO  WO-2021079206 A1 *  4/2021  ............ G06F 11/079

OTHER PUBLICATIONS

C. Bamrung, W. Kamintra, L. Hui, C. Hu, T. Tantidham and P. Mongkolwat, "Self-Organized Unstructured Network Architecture for Device and Service Deployment in Smart Home," 2020 IEEE 2nd Global Conference on Life Sciences and Technologies (LifeTech), 2020, pp. 288-289, doi: 10.1109/LifeTech48969.2020.1570618928.

(Continued)

*Primary Examiner* — Tonia L Dollinger
*Assistant Examiner* — Joseph M Cousins
(74) *Attorney, Agent, or Firm* — Steven R. Fairchild

(57) ABSTRACT

A method for generating a network topology for multiple wireless intelligent devices of a single distributed local network is disclosed. The method includes determining an optimal network topology for the multiple wireless intelligent devices of the single distributed local network. The method further includes generating a plurality of commands to be transmitted to one or more of multiple wireless intelligent devices of the determined optimal network topology. Further, the method includes instructing the plurality of commands to connect the one or more of multiple wireless intelligent devices to generate the determined optimal network topology.

15 Claims, 6 Drawing Sheets

(56) References Cited

U.S. PATENT DOCUMENTS

| | | | |
|---|---|---|---|
| 2022/0104310 A1 | 3/2022 | Hu et al. | |
| 2023/0318926 A1* | 10/2023 | McNamara | H04L 45/76 709/224 |
| 2023/0388896 A1* | 11/2023 | Zhang | H04W 40/248 |

OTHER PUBLICATIONS

Volume16, Issue 5, Deep learning-based intelligent communication systems: Using big data analytics, Mar. 2022, pp. 464-475.

\* cited by examiner

TRANSMISSION OF TELEGRAMS BY A NETWORK DISTRIBUTOR IN AN AUTOMATION NETWORK

TECHNICAL FIELD

The present disclosure generally relates to generating a network topology for multiple wireless intelligent devices of a single distributed local network. In particular, the present disclosure relates to dynamically discovering and connecting multiple wireless intelligent devices in the network.

BACKGROUND

Background description includes information that may be useful in understanding the present invention. It is not an admission that any of the information provided herein is prior art or relevant to the presently claimed invention, or that any publication specifically or implicitly referenced is prior art.

Typically, a conventional cellular communication standard Narrow Band Internet of Things (NB-IoT) that is used for telemetry devices with low data exchange volumes is designed for maintaining a connection of digital communication networks of a wide range of autonomous devices. Use of this standard offers providing greater bandwidth and can be deployed both on cellular network equipment and separately, including over GSM.

In addition, widely used is a Long Range (LoRa) technology that is a low power wireless standard that is designed for data transmission using unlicensed sub-GHz radio frequency bands. The LoRa technology facilitates to enable data transmission over long distances while having low power consumption. Further a low-power wide area networking protocol (LoRaWAN) is designed to connect battery operated equipment to the internet in regional, national or global networks. The LoRaWAN protocol has a star topology where end nodes connect through gateways that form transparent bridges and communicate with central server of a network operator. This allows subscribers to have possibility of transparent bidirectional and secure data transmission to end nodes. However, use of the LoRa technology requires using powerful base stations for efficient performance of the network where a significant amount of time is spent in building the network. Also, use of this technology requires nodes to store information about network environment which significantly increases execution cost.

There is therefore a need in the art to provide a mechanism to simplify structure of the network, while implementing reduction in build time of the network, reducing network density, increasing fault tolerance and decreasing cost of using the network.

SUMMARY

In a first aspect, the present disclosure provides a method for generating a network topology for multiple wireless intelligent devices of a single distributed local network. The method includes determining, by a processing device, an optimal network topology for the multiple wireless intelligent devices of the single distributed local network. The method further includes generating, by the processing device, a plurality of commands to be transmitted to one or more of multiple wireless intelligent devices of the determined optimal network topology. The method further includes instructing, by the processing device, the plurality of commands to connect the one or more of multiple wireless intelligent devices to generate the determined optimal network topology. Each of physical connections and virtual connections of the network topology are used to transmit information amongst the one or more of multiple wireless intelligent devices.

In some embodiments, the method further includes selecting, by the processing device, a control node of the one or more of multiple wireless intelligent devices, wherein a remote distributed application is executed at the control node.

In some embodiments, the control node includes one or more instructions for deployment of the optimal network topology.

In some embodiments, the instructions comprises at least one of: setting a pre-determined number of child network nodes, setting a pre-determined level of data transmission from the one or more of multiple wireless intelligent devices, setting a pre-determined size of data to be transmitted from the multiple wireless intelligent devices, setting a pre-determined amount of changes in controlled and measured parameters, setting a pre-determined measurement hysteresis, and setting a pre-determined throughput of a wireless communication channel.

In some embodiments, the method further includes optimizing, by the processing device, the determined optimal network topology when a sum of each of total data density, sum of edges with maximum density, and value of maximum load connection is greater than a pre-determined maximum of a sum of each of total data density, sum of edges with maximum density, and value of maximum load connection.

In some embodiments, the plurality of commands is instructed to reconfigure the optimized network topology.

In some embodiments, number of the virtual connections are minimized to reduce data density between the one or more of multiple wireless intelligent devices and to improve performance of the network topology.

In some embodiments, density of the network topology is calculated by determining a sum of weight assigned to each of the physical connections of the network topology.

In a second aspect, the present disclosure provides a system for multiple wireless intelligent devices of a single distributed local network. The system includes a processing device comprising a processor communicably coupled to a memory, the memory storing instructions executable by the processor. The processing device is coupled to determine an optimal network topology for the multiple wireless intelligent devices of the single distributed local network. The processor further generates a plurality of commands to be transmitted to one or more of multiple wireless intelligent devices of the determined optimal network topology. The processing device is further instructs the plurality of commands to connect the one or more of multiple wireless intelligent devices to generate the determined optimal network topology. Each of physical connections and virtual connections of the network topology are used to transmit information amongst the one or more network nodes.

In some embodiments, the processing device is further operatively coupled to select a control node of the one or more of multiple wireless intelligent devices, wherein a remote distributed application is executed at the control node.

In some embodiments, the control node includes one or more instructions for deployment of the optimal network topology.

In some embodiments, the instructions comprises at least one of: setting a pre-determined number of child network nodes, setting a pre-determined level of data transmission from the one or more of multiple wireless intelligent devices, setting a pre-determined size of data to be transmitted from the multiple wireless intelligent devices, setting a pre-determined amount of changes in controlled and measured parameters, setting a pre-determined measurement hysteresis, and setting a pre-determined throughput of a wireless communication channel.

In some embodiments, the processing device is further operatively coupled to: optimize the determined optimal network topology when a sum of each of total data density, sum of edges with maximum density, and value of maximum load connection is greater than a pre-determined maximum of a sum of each of total data density, sum of edges with maximum density, and value of maximum load connection.

In some embodiments, the plurality of commands is instructed to reconfigure the optimized network topology.

In some embodiments, number of the virtual connections are minimized to reduce data density between the one or more of multiple wireless intelligent devices and to improve performance of the network topology.

In some embodiments, density of the network topology is calculated by determining a sum of weight assigned to each of the physical connections of the network topology.

In a third aspect, the present disclosure provides a non-transitory storage device encoded with a computer program. The computer program includes instructions that when executed by a computer system causes the computer system to determine an optimal network topology for the multiple wireless intelligent devices of the single distributed local network. The computer system is further caused to generate a plurality of commands to be transmitted to one or more of multiple wireless intelligent devices of the determined optimal network topology. The computer system is further caused to instruct the plurality of commands to connect the one or more of multiple wireless intelligent devices to generate the determined optimal network topology, wherein each of physical connections and virtual connections of the network topology are used to transmit information amongst the one or more network nodes.

Various objects, features, aspects, and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The present disclosure generally relates to generating a network topology for multiple wireless intelligent devices of a single distributed local network. In particular, the present disclosure relates to dynamically discovering and connecting multiple wireless intelligent devices in the network.

Typically, prevalent topology generation mechanisms require additional effort and time to rebuild the network when conditions for signal transmission change or number of devices in the network change (added or dropped from the network). However, using these mechanisms require consumption of additional time and resources and require the network devices to store information about network environment for construction of a robust network topology.

The disclosure pertains to ensuring formation of the network topology for a variety of wireless intelligent devices placed on a single distributed local network without requiring each of wireless intelligent device's physical reconfiguration of the distributed local network and wireless connection configuration within the network. At the stage of automatic generation of the distributed local network, the variety of wireless intelligent devices connects to a wireless gateway. This gateway connects devices to a remote distributed application, where the intelligent devices send information about connection and quality of the network. The disclosure evaluates optimality of a network topology using a remote distributed application that sends step-by-step commands to the wireless intelligent devices to organize and provide most optimal configuration to a new network topology.

Figure 1:
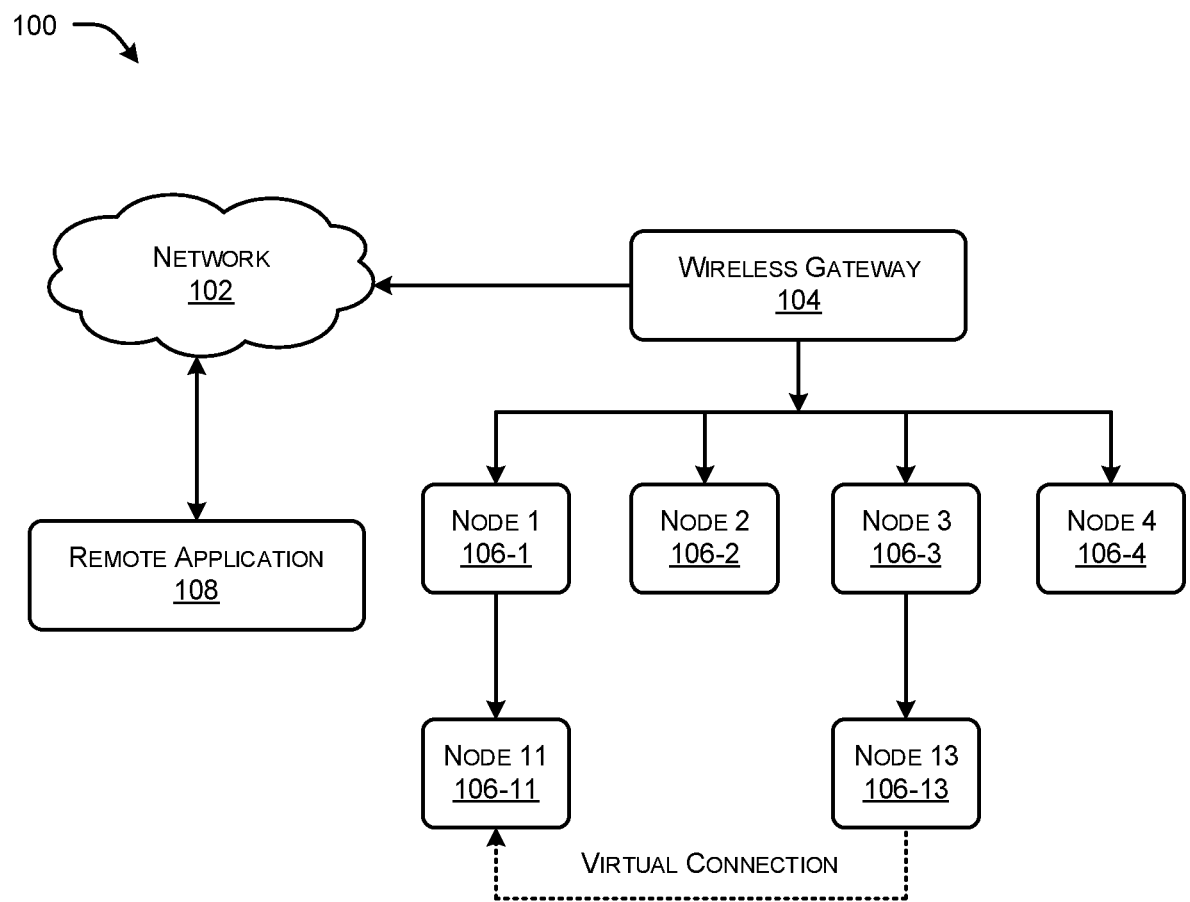
FIG. 1 illustrates a schematic representation of an architecture for implementation of a system for generation of a network topology for multiple wireless intelligent devices of a single distributed local network, according to an embodiment of the present disclosure.

FIG. 1 illustrates a schematic representation of an architecture 100 for implementation of a system 200 for generation of a network topology for multiple wireless intelligent devices (also referred to herein as nodes interchangeably) of a single distributed local network, according to an embodiment of the present disclosure. The architecture 100 includes a plurality of nodes 106-1, 106-2, 106-3, 106-4 . . . 106-N communicably coupled to a wireless gateway 104. The nodes 106-11 and 106-13 are connected to the wireless gateway 104 through node 106-1 and node 106-3 respectively. The nodes 106-11 and 106-13 are connected to each other via a virtual connection (also referred to herein as a virtual link or a virtual network link). The virtual connection refers to a logical link that facilitates to generate a new packet transmission route from an outgoing node to an incoming node of the network. Further, the nodes 106-1 and 106-3 are connected to the nodes 106-11 and 106-13 respectively via a physical connection (also referred to herein as a physical link). The physical connection refers to a connection where one of a node is connected to another node through a communication channel that is established using a communication channel. This is done by using, for example, the IEEE 802.11 protocol, or using a Wi-Fi connection. Topology of the plurality of nodes connected to the wireless gateway 104 is determined and suggested by a remote application 108 that is communicatively coupled to the wireless gateway 104 via a network 102. The communicable coupling may occur through the network 102, which may be a wireless network that may include a variety of network devices, including routers, bridges, servers, computing devices, storage devices, and the like. Communication through the network 102 may be performed using a variety of protocols, for example, Hypertext Transfer Protocol (HTTP), Transmission Control Protocol/Internet Protocol (TCP/IP), Wireless Application Protocol (WAP), and the like. By way of an example, the remote application 108 may be executed on a mobile device, for example, personal digital assistant (PDA), smartphone, tablet, laptop or smart watch and the like.

Figure 2:
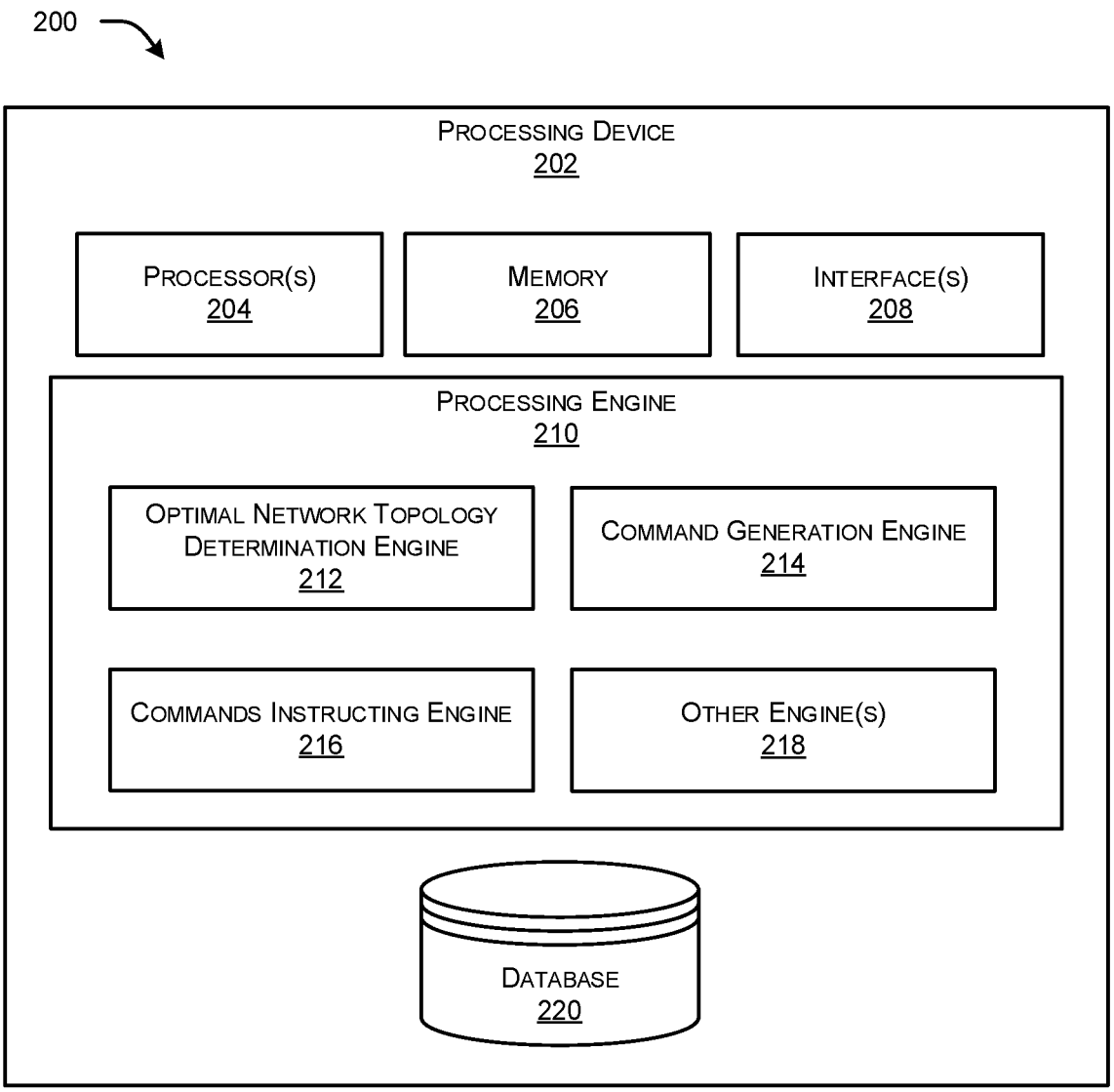
FIG. 2 illustrates a schematic representation of a processor of the system of FIG. 1 for generation of the network topology, according to an embodiment of the present disclosure.

FIG. 2 illustrates a schematic representation of a processing device 202 of the system 200 for generating a network topology for multiple wireless intelligent devices of a single distributed local network, according to an embodiment of the present disclosure. Referring to FIGS. 1 and 2, the processing device 202 includes a processor 204 communicably coupled with a memory 206. The memory 206 stores instructions executable by the processor 204 to cause the processing device 202 to implement the system 200 for generating the network topology. In some embodiments, the processor 204 may be implemented as one or more microprocessors, microcomputers, microcontrollers, digital signal processors, central processing units, logic circuitries, and/or any devices that process data based on operational instructions. Among other capabilities, the processor 204 may be arranged to fetch and execute computer-readable instructions stored in the memory 206 for implementing the system 200. Any reference to a task in the present disclosure may refer to an operation being or that may be performed on data. The memory 206 stores one or more computer-readable instructions or routines in a non-transitory computer readable storage medium. The memory 206 may include any non-transitory storage device including, for example, volatile memory such as RAM, or non-volatile memory such as EPROM, flash memory, and the like. In some embodiments, the processing device 202 may include an interface 208. The interface 208 may include a variety of interfaces, for example, interfaces for data input and output devices, referred to as I/O devices, storage devices, and the like. The interface 208 may also provide a communication pathway for one or more components of the processing device 202. Examples of such components include, but are not limited to, the processing engine 210 and the database 220. In an embodiment, the interface 208 may be communicatively coupled to, for example, a touch based display screen, keypad, trackball, or other components that receives mechanical, audio, or other input from the user.

In some embodiments, the processing device 202 includes the processing engine 210. The processing engine 210 may be implemented as a combination of hardware and programming (for example, programmable instructions) to implement one or more functionalities of the processing engine 210. In examples described herein, such combinations of hardware and programming may be implemented in several different ways. For example, the programming for the processing engine 210 may be processor executable instructions stored on a non-transitory machine-readable storage medium and the hardware for the processing engine 210 may include a processing resource (for example, one or more processors), to execute such instructions. In the present examples, the machine-readable storage medium may store instructions that, when executed by the processing resource, implement the processing engine 210. In such examples, the processing device 202 may include the machine-readable storage medium storing the instructions and the processing resource to execute the instructions, or the machine-readable storage medium may be separate but accessible to the processing device 202 and the processing resource. In other examples, the processing engine 210 may be implemented by electronic circuitry.

In some embodiments, the processing engine 210 may include an optimal network topology determination engine 212, a commands generation engine 214, a commands instructing engine 216, and other engine(s) 218. The other engine(s) 218 may include engines that perform one or more functions ancillary functions associated with the processing engine 210.

The processing device 202 determines an optimal network topology for the multiple wireless intelligent devices (e.g., 106-1, 106-2, 106-3, 106-4, 106-11, 106-13 . . . 106-N) (collectively referred to herein as wireless intelligent devices 106) of the single distributed local network.

The optimal network topology determination engine 212 determines an optimal network topology for the multiple wireless intelligent devices 106 of the single distributed local network.

The commands generation engine 214 generates a plurality of commands to be transmitted to one or more of multiple wireless intelligent devices 106 of the determined optimal network topology.

The commands instructing engine 216 instructs the plurality of commands to connect the one or more of multiple wireless intelligent devices 106 to generate the determined optimal network topology. In an embodiment, each of physical connections and virtual connections of the network topology is used to transmit information amongst the one or more of multiple wireless intelligent devices 106.

In an embodiment, a control node of the one or more of multiple wireless intelligent devices 106 is selected. In yet another embodiment, a remote distributed application 108 is executed at the control node. In an embodiment, the control node includes one or more instructions for deployment of the optimal network topology.

In yet another embodiment, the instructions includes at least one of: setting a pre-determined number of child network nodes, setting a pre-determined level of data transmission from the one or more of multiple wireless intelligent devices, setting a pre-determined size of data to be transmitted from the one or more of multiple wireless intelligent devices, setting a pre-determined amount of changes in controlled and measured parameters, setting a pre-determined measurement hysteresis, and setting a pre-determined throughput of a wireless communication channel.

In another embodiment, the determined optimal network topology is considered optimized when a sum of each of total data density, sum of edges with maximum density, and value of maximum load connection is greater than a pre-determined maximum of a sum of each of total data density, sum of edges with maximum density, and value of maximum load connection.

In yet another embodiment, the plurality of commands is instructed to reconfigure the optimized network topology.

In an embodiment, number of the virtual connections are minimized to reduce data density between the one or more of multiple wireless intelligent devices and to improve performance of the network topology.

In yet another embodiment, density of the network topology is calculated by determining a sum of weight assigned to each of the physical connections of the optimized network topology.

Figure 3A:
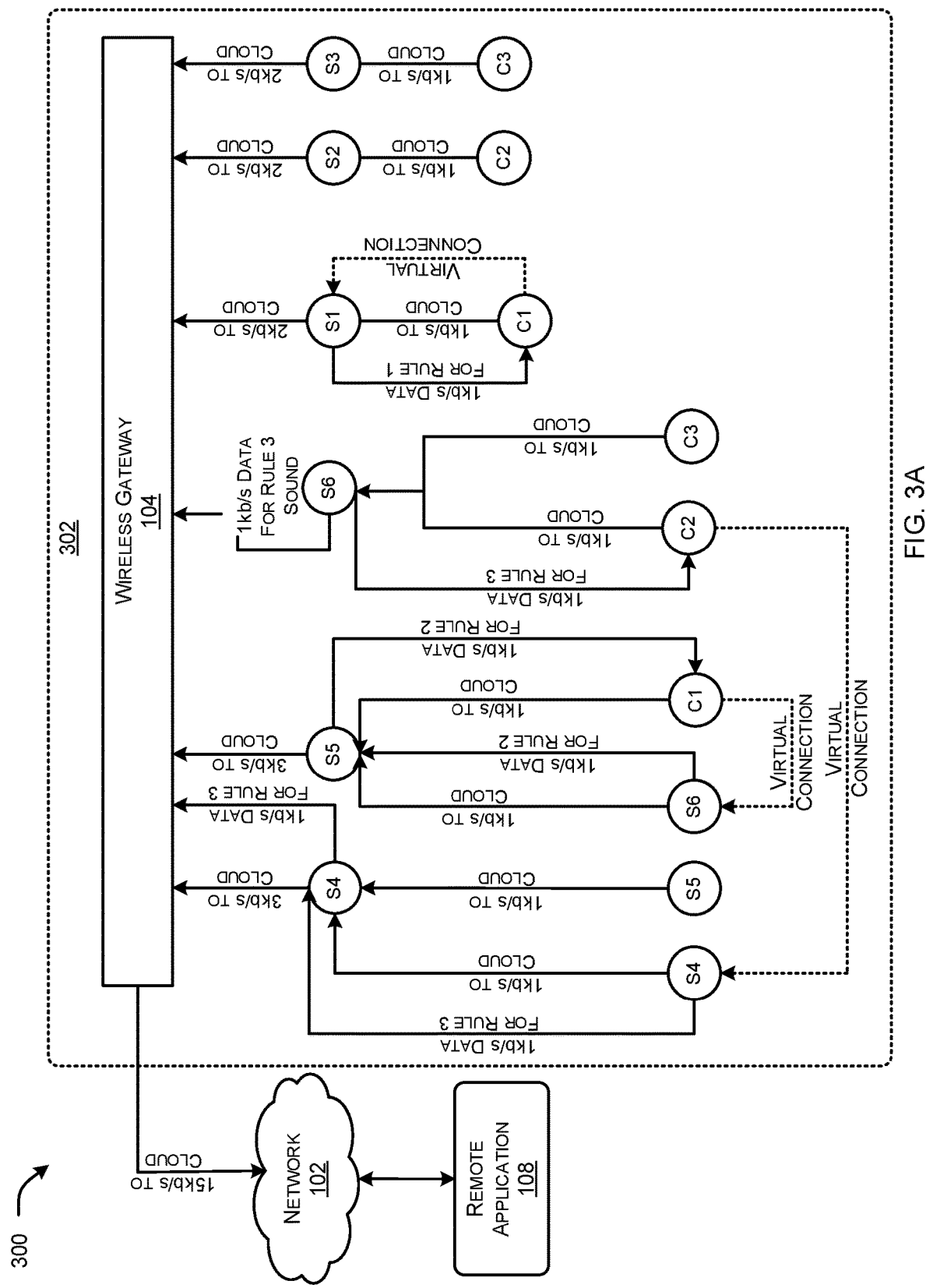
FIG. 3A illustrates exemplary representation of an implementation of a quality model of network topology, according to an embodiment of the present disclosure.

With respect to FIG. 3A, an exemplary representation 300 of an implementation of a quality model of network topology is illustrated. For implementation of the quality model, one of an initial condition that is to be fulfilled is presence of a router, and absence of nodes in the network 302. For creation of the quality model, at each stage, a node or a virtual network link is added to the network 302. Quality of the network topology is determined by a remote application 108 that is communicatively coupled to a wireless gateway 104 of the network 302. In an embodiment, on addition of a new network node or the virtual network link, characteristics of the network 302 may change. However, this does not guarantee reconfiguration of the network topology.

In an embodiment, each of a network topology is represented using a topology graph $G_t=(V_t,E_t)$, where $V_t$ represents a set of nodes, and $E_t$ represents a set of physical and virtual links.

When a new node is added to the network topology, a corresponding vertex is added to the set $V_t$, and the corresponding edge is inserted into the set $E_t$.

In addition, when a virtual link is added, the corresponding edge is added to the set $E_t$.

Figure 3B:
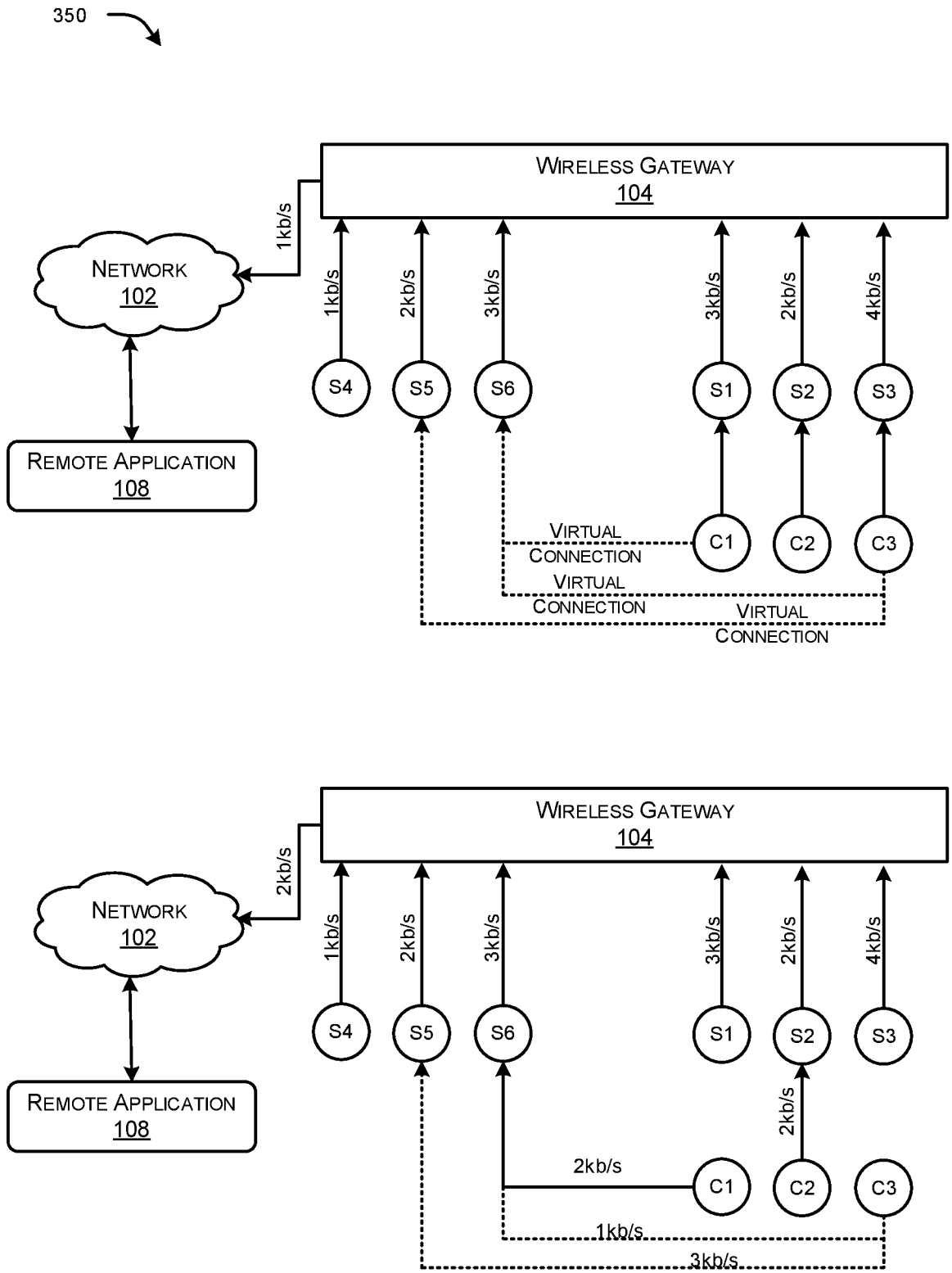
FIG. 3B illustrates exemplary representation of network reconfiguration, according to an embodiment of the present disclosure.

FIG. 3B illustrates exemplary representation 350 of network reconfiguration, according to an embodiment of the present disclosure. By way of an example, network estimation is done using a set of parameters of, say a graph G.

$$NC=k1S+k2AM+k3MX, \quad \text{eq (1)}$$

where k1, k2, k3 represent requirements ratio, $$S=(u,v)Vw(u,v), \quad \text{eq (2)}$$

where S represents total data density, $$AM=(u,v)Tw(u,v), \quad \text{eq (3)}$$

where AM represents sum of edges with maximum data density, $$MX=\max(w(u,v)),(u,v)V, \quad \text{eq (4)}$$

where MX represents value of maximum load connection,

In an embodiment, if it is determined that NC>NCmax, then a decision is made to initiate a network topology optimization process. This is done by:

(a) Searching for a better network topology and building commands to optimize the network topology.

(b) Sending commands to reconfigure the network topology and actually reconfiguring the network topology.

In another embodiment, the network topology optimization process is repeated for item 2.

In an embodiment, for detalization of item 3:

Based on the network topology graph Gr, a graph G=(V, E) is built where V represents a set of nodes, and E represents a set of physical and virtual links.

At Step 1, for each edge (u,v) that is a physical link, the weight w(u,v) is calculated, which determines the maximum possible data density eq (5).

Maximum possible data density between two incidents vertices of the graph G is calculated according to formula:

$$df=vd/mpds \quad \text{eq (5)}$$

where vd represents a maximum rate of parameter change in percent per unit of time, percent/sec mp represents a permissible error in percent that does not affect quality of system regulation, in percent; and ds represent the maximum possible data size in a packet when transferring data from one node to another.

At Step 2, calculation of the maximum possible data density between two graph vertices is being executed va, vbV, vavb.

Using a calculation method, a search is performed from a root of the graph. At each step of the search, a vertex of the graph from which search is carried out is denoted as 'u'. When a vertex 'v' is found adjacent to 'u', this event is marked by putting the value 'u.' in [u] field.

Further, the search is repeated from the vertex 'v', i.e. vertex 'v' becomes 'u'.

As a result of the search, a predecessor subgraph is obtained that is defined as:

$$G=(V,E), \text{ where } E=\{([v],v):vV \text{ and } [v]NIL\}$$

As a predecessor subgraph is a search forest consisting of search trees, search algorithm uses timestamps d[v] and f[v] which are integers from 1 to 2|V|. For each vertex, d[v] and f[v] are not initially specified.

When a vertex is found, the value d[v] is assigned to the vertex. When the vertex is fully processed, i.e. when the list of vertices adjacent to the vertex is completely scanned, f[v] is assigned to the vertex.

Each of the vertex falls into only one search tree. Once vertices d[v] and f[v] have been defined, calculation of the maximum possible data density between two vertices of the graph of the current 'v' and an adjacent vertex 'u', for which the label d[v] is defined and f[v] is not defined.

$$w(u,v)=kVk,kuw(v,k), \quad \text{eq (6)}$$

where Vk represents set of vertices adjacent to v.

Next, the weight of the edge (u,v) of the graph G is set equal to the calculated value w(u,v).

In an embodiment, for detalization of item 5:

Increasing the data density between the network nodes adds virtual links. If there is a physical link (u,v) between the same network nodes as the virtual one (k,q), u=k, v=q, then such a virtual link is not added. And if such a link was added earlier, then it is removed from the graph. Therefore, in order to reduce the data density between nodes and to improve the performance of the network topology, it is necessary to minimize the number of virtual vertices.

To execute this, in another embodiment, for each virtual link (u,v) yr Evr, a physical link (u,v) is formed sequentially, and the physical link (k,v) is removed, where k is the parent node of the edge (k,v).

In an embodiment, for modeling a quality of item 3 of the network topology, if an estimation of the new network topology formed is NCnew<NC, then this network topology is considered a new one. Further, a command is formed to rebuild the network and the above mentioned actions are performed repeated. Item 5 ends when it is not possible to build better topology.

Figure 4:
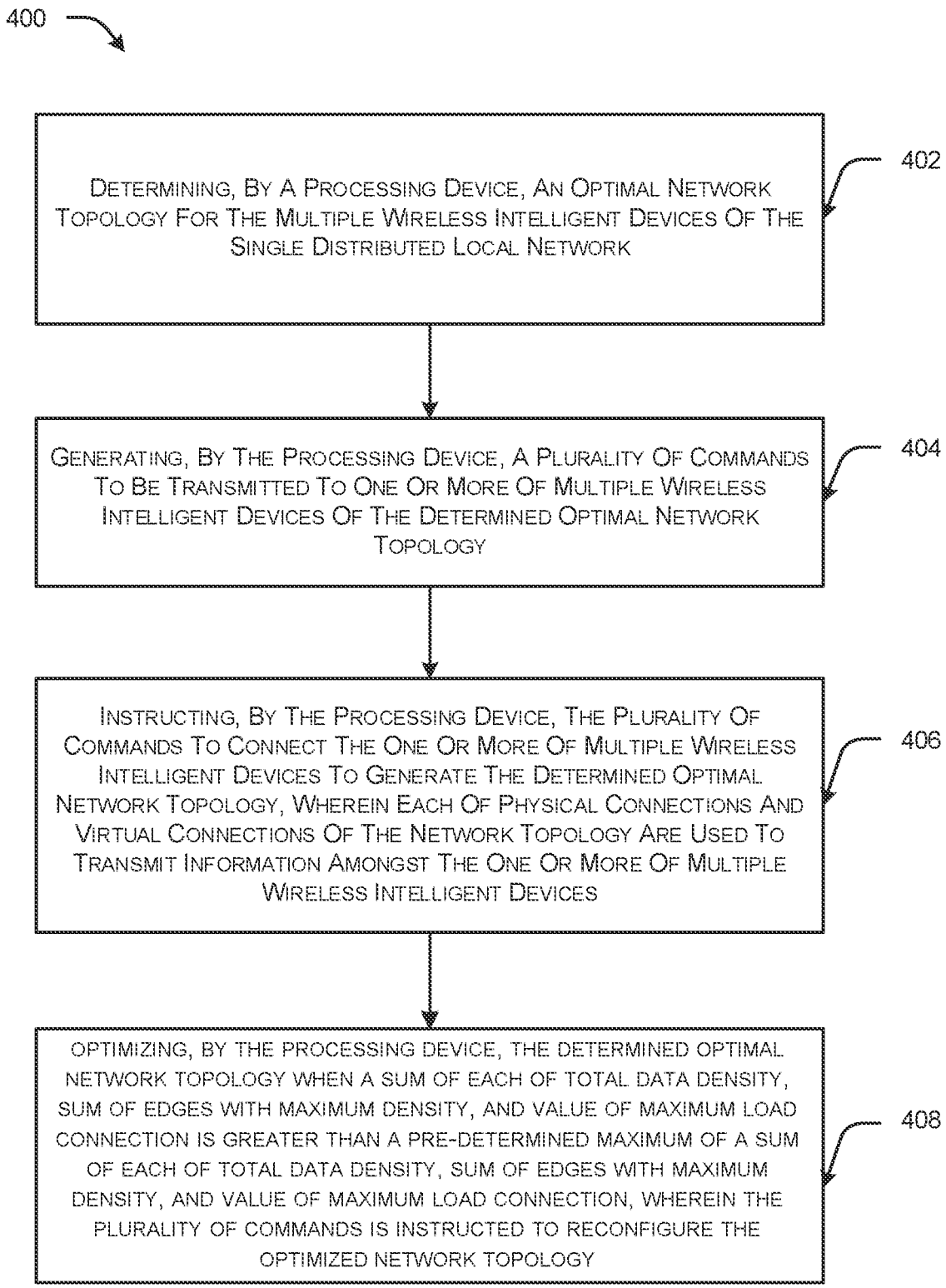
FIG. 4 illustrates a schematic flow chart for a method for generating a network topology for multiple wireless intelligent devices of a single distributed local network, according to an embodiment of the present disclosure.
Figure 5:
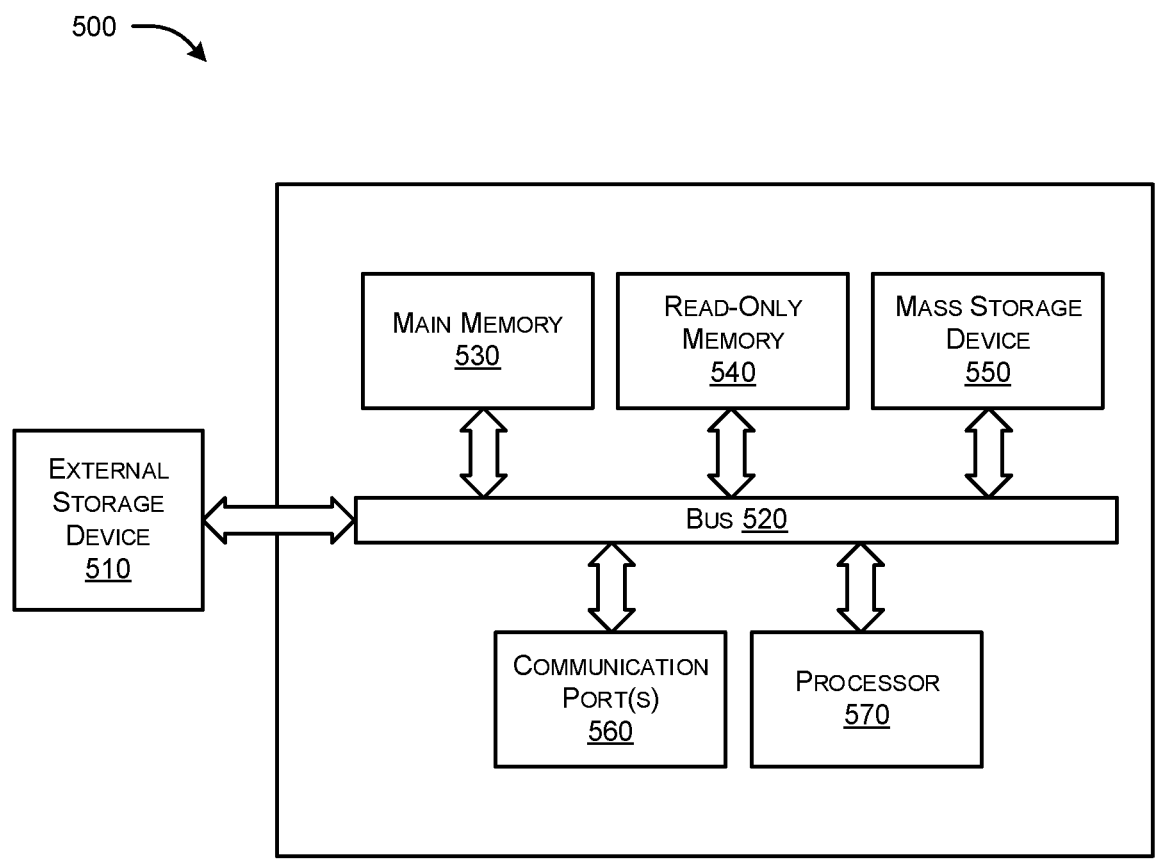
FIG. 5 illustrates an exemplary schematic block diagram of a computer system for implementation of the system of FIG. 2.

FIG. 4 illustrates a schematic flow chart for a method 400 for generating a network topology for multiple wireless intelligent devices of a single distributed local network, according to an embodiment of the present disclosure. Referring now to FIGS. 1, 2, and 4, at step 402, the method 400 includes determining, by a processing device, an optimal network topology for the multiple wireless intelligent devices of the single distributed local network. At step 404, the method 400 further includes generating, by the processing device, a plurality of commands to be transmitted to one or more of multiple wireless intelligent devices of the determined optimal network topology. At step 406, the method 400 further includes instructing, by the processing device, the plurality of commands to connect the one or more of multiple wireless intelligent devices to generate the determined optimal network topology. Each of physical connections and virtual connections of the network topology are used to transmit information amongst the one or more of multiple wireless intelligent devices FIG. 5 illustrates an exemplary schematic block diagram of a computer system 500 for implementation of the system 200 of FIG. 2. As shown in FIG. 5, the computer system 500 can include an external storage device 510, a bus 520, a main memory 530, a read only memory 540, a mass storage device 550, communication port 560, and a processor 570. A person skilled in the art will appreciate that the computer system may include more than one processor and communication ports. Examples of processor 570 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 570 may include various modules associated with embodiments of the present invention. Communication port 560 can be any of an RS-232 port for use with a modem based dialup connection, a 10/100 Ethernet port, a Gigabit or 10 Gigabit port using copper or fibre, a serial port, a parallel port, or other existing or future ports. Communication port 560 may be chosen depending on a network, such a Local Area Network (LAN), Wide Area Network (WAN), or any network to which computer system connects. Memory 530 can be Random Access Memory (RAM), or any other dynamic storage device commonly known in the art. Read-only memory 540 can be any static storage device(s) e.g., but not limited to, a Programmable Read Only Memory (PROM) chips for storing static information e.g., start-up or BIOS instructions for processor 570. Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage, and communication blocks. Bus 520 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g., a display, keyboard, and a cursor control device, may also be coupled to bus 520 to support direct operator interaction with a computer system. Other operator and administrative interfaces can be provided through network connections connected through communication port 560. The external storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Referring now to FIGS. 1 and 5, the non-transitory storage device 550 is encoded with a computer program. The computer program includes instructions that when executed by the computer system 500 causes the computer system 500 to determine an optimal network topology for the multiple wireless intelligent devices of the single distributed local network. The computer system 500 is further caused to generate a plurality of commands to be transmitted to one or more of multiple wireless intelligent devices of the determined optimal network topology. The computer system 500 is further caused instruct the plurality of commands to connect the one or more of multiple wireless intelligent devices to generate the determined optimal network topology.

Thus, the disclosed method and system try to overcome the problem of requirement of additional time to rebuild the network when conditions for signal transmission change or a count of number of nodes in the network changes. The disclosed method and system enables to initially build a network structure. Next, the built network structure is optimized which leads to a significant gain in terms of time consumed. In addition, the disclosed method and system does not require nodes of the network to store information about network environment thereby significantly reducing cost of building the network structure. Thus, the disclosed method and system facilitates to simplify network structure, reduce build time of network structure, reduce density of transmitted data, increase fault tolerance and decrease cost of using the network.

As will be appreciated by those skilled in the art, the techniques described in the various embodiments discussed above are not routine, or conventional or well understood in the art. The techniques discussed above may provide determining, by a processor, an optimal network topology for the multiple wireless intelligent devices of the single distributed local network. The technique may provide generating, by the processor, a plurality of commands to be transmitted to one or more of multiple wireless intelligent devices of the determined optimal network topology. The technique may further provide instructing, by the processor, the plurality of commands to connect the one or more of multiple wireless intelligent devices to generate the determined optimal network topology. Each of physical connections and virtual connections of the network topology are used to transmit information amongst the one or more of multiple wireless intelligent devices.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The invention claimed is:

1. A method for generating a network topology for multiple wireless intelligent devices of a single distributed local network, said method comprising:
    determining, by a processing device, an optimal network topology for the multiple wireless intelligent devices of the single distributed local network;
    generating, by the processing device, a plurality of commands to be transmitted to one or more of multiple wireless intelligent devices of the determined optimal network topology; and
    instructing, by the processing device, the plurality of commands to connect the one or more of multiple wireless intelligent devices to generate the determined optimal network topology, wherein each of physical connections and virtual connections of the network topology are used to transmit information amongst the one or more of multiple wireless intelligent devices, and
    optimizing, by the processing device, the determined optimal network topology when a sum of each of total data density, sum of edges with maximum density, and value of maximum load connection is greater than a pre-determined maximum of a sum of each of total data density, sum of edges with maximum density, and value of maximum load connection.

2. The method as claimed in claim 1, further comprising:
    selecting, by the processing device, a control node of the one or more of multiple wireless intelligent devices, wherein a remote distributed application is executed at the control node.

3. The method as claimed in claim 2, wherein the control node comprises one or more instructions for deployment of the optimal network topology.

4. The method as claimed in claim 3, wherein the instructions comprises at least one of:
    setting a pre-determined number of child network nodes,
    setting a pre-determined level of data transmission from the one or more of multiple wireless intelligent devices,
    setting a pre-determined size of data to be transmitted from the one or more of multiple wireless intelligent devices,
    setting a pre-determined amount of changes in controlled and measured parameters,
    setting a pre-determined measurement hysteresis, and
    setting a pre-determined throughput of a wireless communication channel.

5. The method as claimed in claim 1, wherein the plurality of commands is instructed to reconfigure the optimized network topology.

6. The method as claimed in claim 1, wherein number of the virtual connections are minimized to reduce data density between the one or more of multiple wireless intelligent devices and to improve performance of the network topology.

7. The method as claimed in claim 1, wherein density of the network topology is calculated by determining a sum of weight assigned to each of the physical connections of the network topology.

8. A non-transitory storage device encoded with a computer program, the computer program comprising instructions that when executed by a computer system causes the computer system to:
    determine an optimal network topology for the multiple wireless intelligent devices of the single distributed local network;
    generate a plurality of commands to be transmitted to one or more of multiple wireless intelligent devices of the determined optimal network topology;
    instruct the plurality of commands to connect the one or more of multiple wireless intelligent devices to generate the determined optimal network topology, wherein each of physical connections and virtual connections of the network topology are used to transmit information amongst the one or more network nodes and
    optimize the determined optimal network topology when a sum of each of total data density, sum of edges with maximum density, and value of maximum load connection is greater than a pre-determined maximum of a sum of each of total data density, sum of edges with maximum density, and value of maximum load connection.

9. A system for generating a network topology for multiple wireless intelligent devices of a single distributed local network, said system comprising:
    a processing device comprising a processor communicably linked to a memory, the memory storing instructions executable by the processor, the processing device to:
        determine an optimal network topology for the multiple wireless intelligent devices of the single distributed local network;

generate a plurality of commands to be transmitted to one or more of multiple wireless intelligent devices of the determined optimal network topology;

instruct the plurality of commands to connect the one or more of multiple wireless intelligent devices to generate the determined optimal network topology, wherein each of physical connections and virtual connections of the network topology are used to transmit information amongst the one or more network nodes; and optimize the determined optimal network topology when a sum of each of total data density, sum of edges with maximum density, and value of maximum load connection is greater than a pre-determined maximum of a sum of each of total data density, sum of edges with maximum density, and value of maximum load connection.

10. The system as claimed in claim 9, wherein the processing device is further:

selects a control node of the one or more of multiple wireless intelligent devices, wherein a remote distributed application is executed at the control node.

11. The system as claimed in claim 10, wherein the control node comprises one or more instructions for deployment of the optimal network topology.

12. The system as claimed in claim 11, wherein the instructions comprises at least one of:

setting a pre-determined number of child network nodes, setting a pre-determined level of data transmission from the one or more of multiple wireless intelligent devices, setting a pre-determined size of data to be transmitted from one or more of multiple wireless intelligent devices, setting a pre-determined amount of changes in controlled and measured parameters, setting a pre-determined measurement hysteresis, and setting a pre-determined throughput of a wireless communication channel.

13. The system as claimed in claim 9, wherein the plurality of commands is instructed to reconfigure the optimized network topology.

14. The system as claimed in claim 9, wherein number of the virtual connections are minimized to reduce data density between the one or more of multiple wireless intelligent devices and to improve performance of the network topology.

15. The system as claimed in claim 9, wherein density of the network topology is calculated by determining a sum of weight assigned to each of the physical connections of the network topology.

* * * * *